US011824750B2

(12) United States Patent
Chawla et al.

(10) Patent No.: US 11,824,750 B2
(45) Date of Patent: Nov. 21, 2023

(54) MANAGING INFORMATION TECHNOLOGY INFRASTRUCTURE BASED ON USER EXPERIENCE

(71) Applicant: Workspot, Inc., Campbell, CA (US)

(72) Inventors: Puneet Chawla, Fremont, CA (US); Robert Zeljko, Campbell, CA (US); Amitabh Sinha, San Jose, CA (US); Abhijeet Kumar, Mountain View, CA (US); Christopher N. Thomas, Kernville, CA (US); Yatin Vasavada, San Jose, CA (US)

(73) Assignee: Workspot, Inc., San Jose, CA (US)

( * ) Notice: Subject to any disclaimer, the term of this patent is extended or adjusted under 35 U.S.C. 154(b) by 0 days.

(21) Appl. No.: 17/572,453

(22) Filed: Jan. 10, 2022

(65) Prior Publication Data
US 2022/0131779 A1  Apr. 28, 2022

Related U.S. Application Data

(63) Continuation of application No. 14/149,383, filed on Jan. 7, 2014, now Pat. No. 11,223,547.

(60) Provisional application No. 61/749,676, filed on Jan. 7, 2013, provisional application No. 61/749,678, filed on Jan. 7, 2013.

(51) Int. Cl.
*H04L 43/0876* (2022.01)
(52) U.S. Cl.
CPC .............. *H04L 43/0876* (2013.01)
(58) Field of Classification Search
CPC ........... H04L 43/0876; H04L 41/0681; H04L 41/147; H04L 41/5064; H04L 67/14; H04L 67/306; H04L 67/535; H04L 41/5067; G06F 2201/865; G06F 11/3006; G06F 11/302; G06F 11/321; G06F 11/3419; G06F 11/3447; G06F 11/3466
USPC ........................................................ 709/224
See application file for complete search history.

(56) References Cited

U.S. PATENT DOCUMENTS

| | | | |
|---|---|---|---|
| 6,154,769 A | 11/2000 | Cherkasova et al. | |
| 8,560,699 B1 * | 10/2013 | Theimer | G06F 9/45558 705/26.1 |
| 2005/0251792 A1 * | 11/2005 | Smith | G06F 11/3438 717/131 |
| 2006/0294246 A1 * | 12/2006 | Stieglitz | H04W 8/00 709/228 |

(Continued)

FOREIGN PATENT DOCUMENTS

JP  2005196269 A  * 12/2003

*Primary Examiner* — Tan Doan
(74) *Attorney, Agent, or Firm* — Nixon Peabody LLP

(57) ABSTRACT

A system and a method are disclosed for managing information technology (IT) infrastructure. Client devices interact with applications of an enterprise that may be hosted in data centers of the enterprise or as software as a service (SaaS) applications. An IT management system receives session information from client devices. The session information describes interactions of client devices with applications, for example, response time of applications for each interaction. The IT management system analyzes the session information received from various client devices to identify issues with IT infrastructure. The IT management system generates warning messages describing the issues identified and sends them for review, for example, by a system administrator.

17 Claims, 10 Drawing Sheets

(56) References Cited

U.S. PATENT DOCUMENTS

| | | | |
|---|---|---|---|
| 2012/0246297 A1* | 9/2012 | Shanker | H04L 67/289 709/224 |
| 2012/0303736 A1* | 11/2012 | Novotny | H04L 67/1097 709/213 |
| 2013/0173778 A1 | 7/2013 | Hsy et al. | |
| 2013/0254320 A1 | 9/2013 | Bhalerao et al. | |
| 2014/0006609 A1 | 1/2014 | Gay et al. | |
| 2014/0089746 A1 | 3/2014 | Brauer et al. | |
| 2015/0019713 A1* | 1/2015 | Bugenhagen | G06F 11/3006 709/224 |

* cited by examiner

| 150 Session Record | | | | | | | |
|---|---|---|---|---|---|---|---|
| Application ID 210 | Company ID 215 | User ID 220 | Device ID 225 | Location 230 | Click Time 235 | Application URL 240 | Parameters 245 | Response Time 250 |

FIG. 2

| | Date & Time | Event | User Name | Geo | Device |
|---|---|---|---|---|---|
| | 12:10 PM 07/11/2013 | John Smith accessed 1st page of App Store Review | john | California | iPad 3, WiFi |
| | 12:10 PM 07/11/2013 | John Smith opened document App Store Review | john | California | iPad 3, WiFi |
| | 12:10 PM 07/11/2013 | John Smith downloaded document App Store Review | john | California | iPad 3, WiFi |
| | 12:10 PM 07/11/2013 | John Smith opened app Sharepoint | john | California | iPad 3, WiFi |
| | 12:08 PM 07/11/2013 | John Smith accessed 7th page of document Analyst Briefing | john | California | iPad 3, WiFi |
| | 12:06 PM 07/11/2013 | John Smith accessed 6th page of document Analyst Briefing | john | California | iPad 3, WiFi |
| | 12:05 PM 07/11/2013 | John Smith accessed 5th page of document Analyst Briefing | john | California | iPad 3, WiFi |

Hide Filters john

From Jul 5, 2013
To Jul 11, 2013    Apply

Filters
Applications
⦿ All Apps
○ Select Apps
Geos
⦿ All Geos
○ Select Geos
Networks
⦿ All Networks
○ Select Networks
Devices
⦿ All Devices
○ Select Devices

FIG. 7

MANAGING INFORMATION TECHNOLOGY INFRASTRUCTURE BASED ON USER EXPERIENCE

CROSS REFERENCE TO RELATED APPLICATIONS

This application is a continuation of U.S. application Ser. No. 14/149,383, filed Jan. 7, 2014, which claims the benefit of, and priority to, U.S. Provisional Application No. 61/749,676, filed Jan. 7, 2013 and U.S. Provisional Application No. 61/749,678, filed Jan. 7, 2013, each of which is incorporated by reference in its entirety.

BACKGROUND

Field of Art

The disclosure relates to management of information technology (IT) infrastructure based on user experience, for example, response time of applications of an enterprise obtained from client devices of users.

Description of the Related Art

Enterprises use various applications to manage their information, for example, applications for managing inventory, sales, communication between employees, and so on. Employees use client devices to access these applications, for example, desktops, laptops, smartphones, tablets, and the like. Enterprises typically provide the client devices to employees for work related use. Enterprises use IT infrastructure to manage these applications and client devices. The IT infrastructure of an enterprise is managed by IT personnel.

If there is an issue with the IT infrastructure, a user has to inform IT personnel, for example, by creating a problem ticket. Often, there are delays involved in filing of a ticket from the time an issue is created. Users may be busy and may not wish to spend time to file a ticket unless the problem is severe. For example, users often do not file a problem ticket if the response of an application is slow even though the slow response may be an indication of a significant issue with the IT infrastructure.

There can be significant delays involved in IT addressing an issue even after a ticket is filed. IT personnel need to triage the issue and then analyze the cause of the issue. Once the cause of a problem is determined, the IT personnel take appropriate measures to address the issue. The overall process can be slow with a turnaround time of days or weeks depending on the severity of the issue. This results in loss of productivity of employees of the enterprise.

IT infrastructure management has become further complicated due to advances in technology. For example, there is an increasing trend towards using software as a service (SaaS) applications. SaaS applications are not managed by IT and IT has limited insight into issues related to SaaS applications. Furthermore, there is an increasing trend towards the policy of employees using their own devices (BYOD, or bring your own devices) instead of the IT department providing the devices. As a result, IT has less control over the client devices. Conventional IT infrastructure is not properly designed to handle these disruptive trends.

SUMMARY

Described embodiments allow an IT (information technology) management system to identify issues related to IT infrastructure based on information received from client devices. The IT management system receives session records describing interactions of the client devices with applications, for example, the response time of the application. The IT management system determines an aggregate value based on response time of the application obtained from the session records. The IT management system receives new session records and compares response times based on the new session records with the aggregate response time based on previous records. If the response time based on the new session records exceeds the aggregate response based on previous session records, the IT management system sends a warning message.

In an embodiment, the aggregate response time is determined for a subset of session records received, for example, session records received from a location. This allows the IT management system to provide specific details describing the identified issue. For example, if the response time based on new session records from a location has increased above the aggregate response time based on past session records, the warning message indicates an issue associated with the location.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 2 shows an example of a session record storing information describing activity of a client device used by the IT management system, in accordance with an embodiment of the invention.

FIG. 7 shows a screenshot of a user interface showing session records collected by the IT management system, in accordance with an embodiment of the invention.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
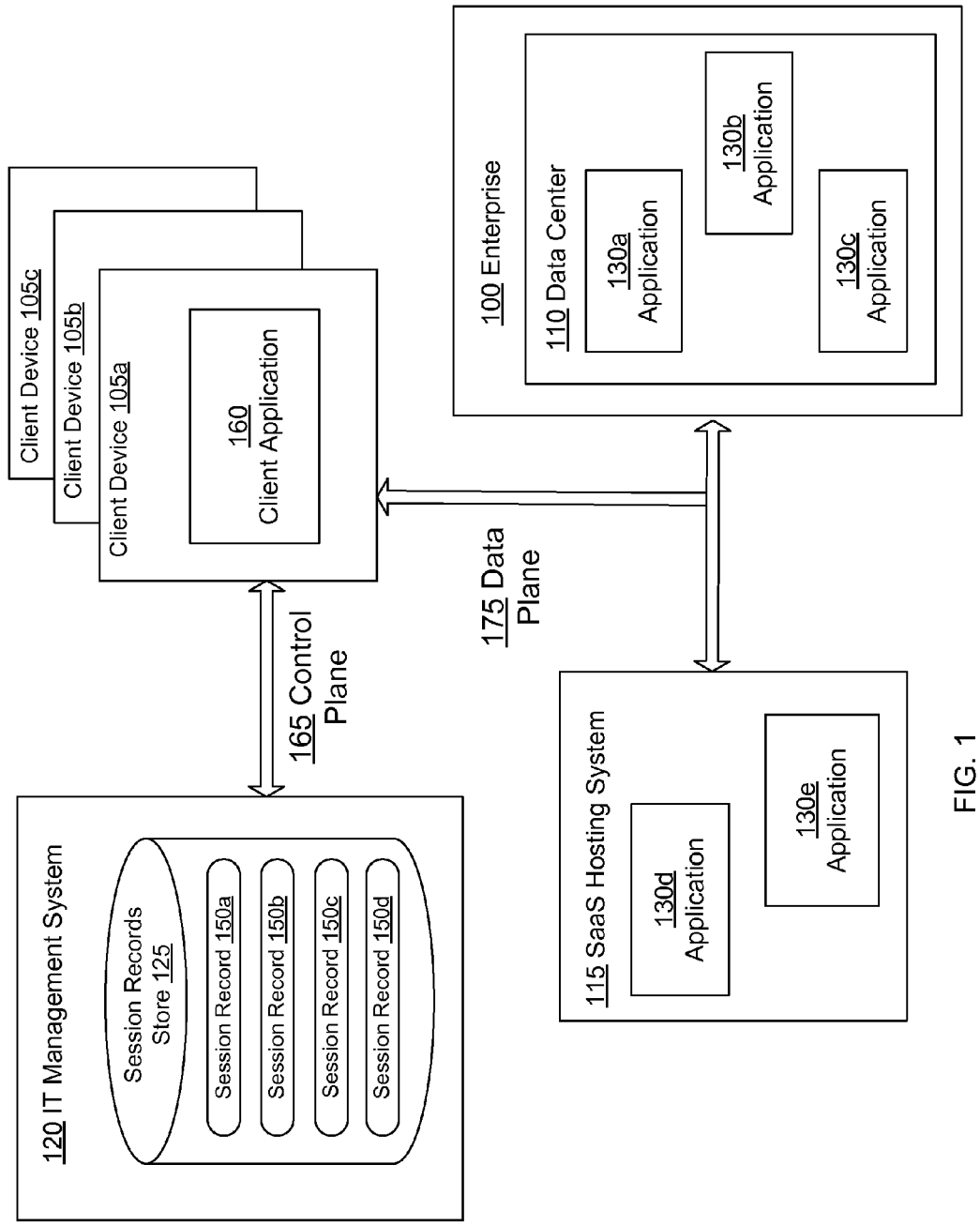
FIG. 1 shows the overall system environment illustrating an IT management system for managing applications of an enterprise, in accordance with an embodiment of the invention.

FIG. 1 shows the overall system environment illustrating an IT management system for managing applications of an enterprise, in accordance with an embodiment of the invention. The overall system environment includes an IT management system 120, one or more client devices 105, an enterprise 100, and SaaS hosting system 115. The client device 105 allows users to use applications 130 of the enterprise 100 as well as the SaaS applications 130. The IT management system 120 receives information from the client devices 105 and uses the information for performing various tasks related to IT management. Other embodiments can use more or less or different systems than those illustrated in FIG. 1. Functions of various modules and systems described herein can be implemented by other modules and/or systems than those described herein.

The enterprise 100 allows users of the client devices 105 to access applications 130 associated with the enterprise 100. These include applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with the enterprise 100 may include productivity applications, for example, word processing applications, search applications, document viewers, collaboration applications. Applications associated with the enterprise 100 may also include applications that allow communication between people, for example, email, messaging, web meetings, and so on. An enterprise is also referred to herein as a company.

The applications 130 associated with the enterprise may be hosted within data centers 110 that are managed by the enterprise. A data center 110 comprises servers that host various applications 130 for the enterprise. A data center 110 typically comprises IT infrastructure that is managed by IT personnel of the enterprise. The IT infrastructure may include servers, network infrastructure, software, and so on. If there is an issue related to an application reported by a user, the IT personnel can check the health of the infrastructure used by the application. In general, IT personnel control the management of the IT infrastructure of the data centers 110.

An application 130 may be a SaaS application that is hosted by a third party system, for example, the SaaS hosting system 115. SaaS applications may be considered as being hosted in the cloud. As shown in FIG. 1, applications 130d and 130e are hosted by the SaaS hosting system 115. SaaS applications may be accessed by the client devices 105 using a user interface, for example, a user interface of client application 160. The SaaS hosting system 115 is managed by a vendor that is typically independent of the IT department of the enterprise 100. As a result, the IT personnel of the enterprise have less visibility in issues related to SaaS applications. For example, if a user complains of an issue with a SaaS application, the IT personnel of the enterprise may not have all the information required to analyze the problem. The problem is further complicated by the fact that applications hosted within the data center 110 may interact with SaaS applications, thereby making analysis of the issues difficult for both applications hosted within the data center and in the SaaS hosting system 115.

The IT management system 120 allows management of IT infrastructure by providing appropriate information to the IT personnel. The IT management system may itself be hosted in the cloud or within the data center of an enterprise. The IT management system can manage a single enterprise or multiple enterprises. The IT management system 120 collects information from various client devices 105 used by users associated with the enterprise 100.

In an embodiment, the client device 105 sends to the IT management system 120, information describing various interactions performed by the client device 105 with applications 130. The client device 105 may send the information describing the interactions as they occur, for example, after each interaction. Alternatively, the client device 105 may send the information in a batch mode, for example, after a set of interactions have occurred. The information describing the interactions may be stored by the IT management system 120 as session records that describe sessions of each client device. The IT management system 120 stores the session records 150 received from various client devices 105 in a session records store 125.

The IT management system 120 analyzes the session records 150 to generate reports. The generated reports may be displayed to IT personnel. This allows IT personnel to analyze the interactions between the client devices 105 and the applications 130. In an embodiment, the IT management system 120 analyzes the data stored in the session records 150 to evaluate various policies associated with the enterprise. These policies describe patterns that are considered indicative of issues that need to be addressed by the IT personnel. For example, a policy may specify that if the average response time of an application is above a threshold value, an alert should be sent to the IT personnel indicating that there may be an issue with the performance of the application.

As illustrated in FIG. 1, the information analyzed by the IT management system 120 involves communications belonging to a control plane 165. The control plane refers to information exchanged between the IT management system 120 and client devices that provide information useful for controlling the IT infrastructure. This is in contrast with the data plane 175 that comprises interactions between the client devices 105 and the applications 130 hosted by the data centers 110 of the enterprise 100 or by the SaaS hosting systems 115. The interactions of the data plane 175 include the requests and responses from the applications 130.

Conventional IT management techniques perform analysis of information available using the interactions in the data plane 175 and therefore require access to the IT infrastructure used by the applications 130. In contrast, embodiments described herein use information available in the control plane 165 that is independent of the data plane 175. This allows embodiments to perform analysis of the health of the IT infrastructure without having direct access to the various components of the IT infrastructure, for example, the servers and network infrastructure. As a result, the embodiments can seamlessly analyze the information irrespective of whether the applications are hosted by the data center of the enterprise 100 or by a SaaS hosting system 115.

Furthermore, the IT management system 120 provides a centralized store of all the information required to analyze IT issues for the enterprise. The IT management system 120 can manage multiple enterprises, thereby providing analysis of data across enterprises. This provides insight into issues related to IT that may not be available to IT personnel of a single enterprise. For example, the IT asset management 120 may determine whether an application is performing slowly across all enterprises or only for a specific enterprise. If an application is performing slowly across all enterprises, the issue is likely to be addressed by the provider of the application rather than by a specific enterprise. However, if an application is performing slowly for a specific enterprise but performing well for all other enterprises, the issue is likely to be addressed by IT personnel of the enterprise, for example, by providing better infrastructure. This allows the IT management system to provide insight into the issues and also to identify the target personnel who should address a particular issue.

Systems and applications shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc.

The interactions between the client devices 105, the IT management system 120, enterprise 100, and the SaaS hosting system 115 are typically performed via a network, for example, via the internet. In one embodiment, the network uses standard communications technologies and/or protocols. In another embodiment, the entities can use custom and/or dedicated data communications technologies instead of, or in addition to, the ones described above. Depending upon the embodiment, the network can also include links to other networks such as the Internet.

FIG. 1 and the other figures use like reference numerals to identify like elements. A letter after a reference numeral, such as "105a," indicates that the text refers specifically to the element having that particular reference numeral. A reference numeral in the text without a following letter, such as "105," refers to any or all of the elements in the figures bearing that reference numeral (e.g. "105" in the text refers to reference numerals "105a" and/or "105b" in the figures).

FIG. 2 shows an example of a session record storing information describing activity of a client device used by the IT management system, in accordance with an embodiment of the invention. The information illustrated in FIG. 2 comprises information stored in a session record 150. The information included in the session record 150 includes application ID (identifier) 210, company ID 215, user ID 220, device ID 225, location 230, click time 235, application URL 240, parameters 245, and response time 250. Other and/or different attributes may be stored in the session record than those described herein.

The application ID 210 uniquely identifies each application, either for the enterprise or across all enterprises. The company ID 215 uniquely identifies an enterprise. The user ID 220 uniquely identifies a user. The device ID 225 uniquely identifies a device. The location 230 provides the location of the device, for example, the location provided by a GPS (global positioning system) of the client device. The location is also referred to herein as a geo, a geo location, a region, or a geographical location. The location of the client device may be represented using the latitude and the longitude of the client device. The click time 235 is the time that the user clicked for sending the request corresponding to the session record. The application URL (uniform resource locator) 240 corresponds to the URL used by the client device to access the application. The parameters 245 comprise the various parameters sent with the request to the application. The response time 250 is the time taken by the application to respond to the request corresponding to the session record. The session record may include additional information not shown in FIG. 2.

The various attributes of a session record are used by the IT management system 120 as various dimensions along which the session records may be analyzed. For example, the IT management system 120 may analyze the aggregate response time over a time period for an application across all company IDs. Alternatively, the IT management system 120 may analyze the aggregate response time for all applications for a given location 230. The IT management system 120 may combine the information obtained from the session records with additional information. For example, the IT management system 120 may store information describing client devices of users. Accordingly, the IT management system 120 may analyze aggregate response time for an application for different client device types, for example, specific types of tablets or specific types of smartphones.

In an embodiment, the IT management system determines aggregate response times across one or more dimensions mentioned above. The aggregate response time is compared with response time based on subsequent requests. A significant difference, for example, a difference exceeding a threshold value between the response time of subsequent requests and the aggregate response time based on past requests is used to signal a warning indicating an issue with the IT infrastructure.

The dimensions analyzed for determining the aggregate response time are used by the IT management system to locate the problem. For example, if the aggregate response time for a type of client device has increased over time, the IT management system determines that the issue is with that particular type of client devices. If the aggregate response time for requests from a location has increased over time, the IT management system determines that the issue is with that particular location. If the aggregate response time for requests for a particular version or release of an application has increased over time, the IT management system determines that the issue is with that particular version of software or release of software. If the aggregate response time for requests using a particular network has increased over time, the IT management system determines that the issue is with that particular network. If the aggregate response time of requests to applications hosted by a server has increased over time, the IT management system determines that the issue is with that particular server. In an embodiment, the IT management system compares aggregate response time of request from an enterprise with other enterprises or sets of enterprises to determine whether there is an issue with a particular enterprise.

In an embodiment, if the response time of an application has increased for all enterprises, the IT management system determines that the issue is with that particular application. However, if the response time of an application has increased for a particular enterprise but not for other enterprises, the IT management system determines that the issue is with that particular enterprise. The IT management system can also identify if the response time for a particular types of requests for an application has increased over time, thereby providing useful insight into analysis of the issue. The IT management system can also identify if the response time for a particular types or values of parameters of requests for an application has increased over time.

Furthermore, the IT management system can use additional information available in session records, for example, error signals. The IT management system can aggregate session records to determine the context in which errors have increased over time or within a particular time window. The IT management system may also analyze errors in session records to determine downtime or uptime of particular applications in a time window. The IT management system can use the session record information to determine aggregate bandwidth usage of an application. For example, the session record may include the sizes of objects or data received in response to various requests. The IT management system can aggregate the sizes of data to determine aggregate bandwidth usage of applications and analyze the bandwidth usage over time. For example, if the bandwidth usage has increased over time for a particular application, location, server, or enterprise, the IT management system can send a warning message indicating that either the application is performing badly or the IT infrastructure needs to be improved to handle the increased load.

In an embodiment, the IT management system maintains rates of changes of certain metrics, for example, response time of applications for various contexts, bandwidth usage in various contexts, or uptime of applications. The rates of changes are used to predict issues with IT infrastructure before a severe problem is experienced by users. For example, if the IT management system determines that the rate of change of a particular metric has been consistently high for more than a threshold time interval, the IT management system may predict the possibility of an issue with the IT infrastructure.

System Architecture

Figure 3:
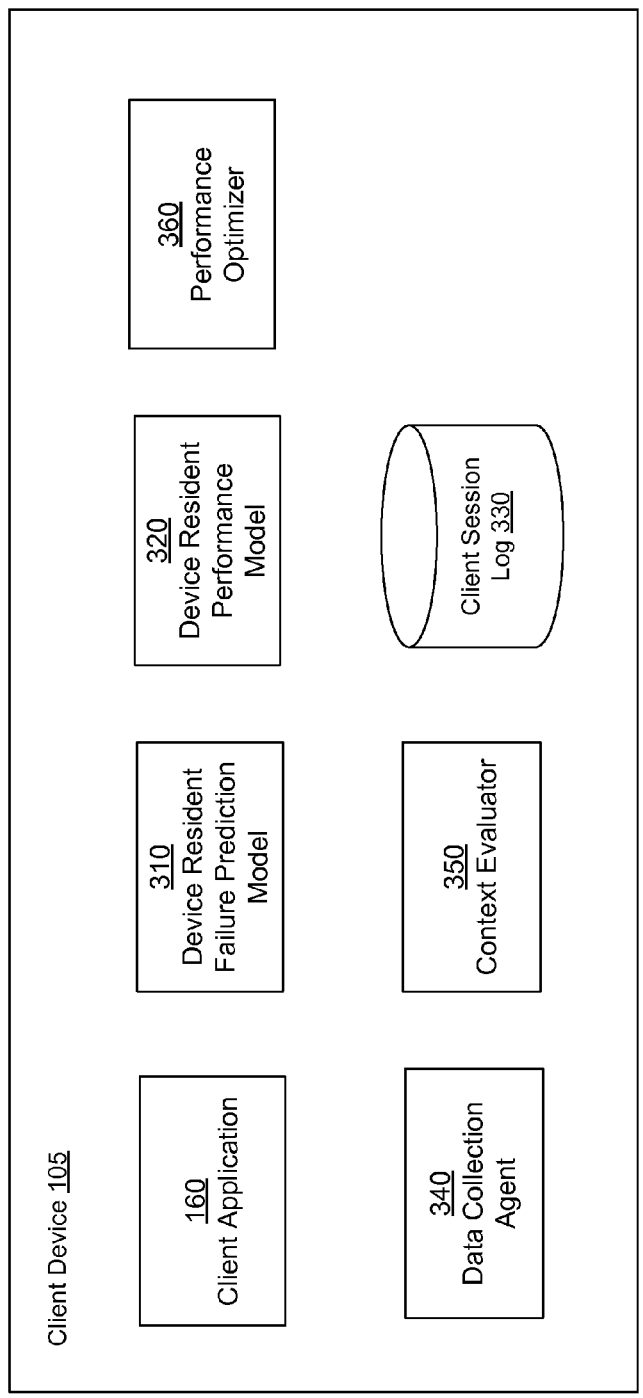
FIG. 3 shows the system architecture of a client device, in accordance with an embodiment.

FIG. 3 shows the system architecture of a client device, in accordance with an embodiment. The client device 105 comprises a context specific failure prediction model 310, a context specific performance model 320, a client application 160, a data collection agent 340, a context evaluator 350, a performance optimizer 360, and a client session log 330. A client device 105 may include additional or less modules than those shown in FIG. 3. Furthermore, specific functionality may be implemented by modules other than those described herein.

The client session log 330 stores logs comprising information of actions taken using the client device. For example, for each request sent by the client device 105, a log may be stored in the client session log 330 with information describing the interaction corresponding to the request. The information stored in each log may correspond to the session record shown in FIG. 2 but may include more or less information. The client session log 330 stores more logs than the number of session records sent by the client device to the IT management system. For example, the types of session records that are sent to the IT management system may be filtered by certain criteria to reduce the communication overhead and also the load on the IT management system as well as the client device.

The client application 160 allows the client device to interact with various applications 130 of the enterprise 100. In some embodiments, a web browser may be used as a client application 160. In other embodiments, the client device 105 may include client applications 160 that are specific to a particular application 130. For example, an emailing system may provide a customized user interface instead of a web based interface. The client application 160 may also be used by a client device to review data from the IT management system 120, for example, to view warnings generated by the IT management system 120. Special privilege may be required for users to view certain type of information. For example, only system administrators may be allowed to view certain enterprise related reports.

The context evaluator 350 determined the context in which the client device is operating. The context of the client device describes the attributes of the current operation of the client device. For example, the same device may be used from different locations. Each location from where the device is used may be associated with different IT management issues. For example, the expected performance of an application in one location may be different from another location. Similarly, the same device may be used by two different users. The same device may be used at two different times.

The context of the client device comprises various attributes including the location in which the client device is operating, the user using the client device, the time at which the device is being used, the enterprise or company for which the device is being used, and so on. Some of the attributes of the context may change more frequently than other attributes. For example, the location of the client device is likely to change more frequently than the company for which the client device is being used.

The context evaluator 350 monitors changes in the attributes of the context of the client device. In an embodiment, the context evaluator 350 periodically checks if an attribute of the context has changed, for example, by monitoring changes in the location of the device. In other embodiments, other applications send a signal to the context evaluator 350 when an attribute of the context changes, for example, if the status of an employee changes, thereby affecting the employees access to various applications. If the context of the client device changes, the context evaluator 350 sends the new context to the IT management system. In response, IT management system provides context specific failure prediction model 310 and/or a context specific performance model 320 to the client device.

In an embodiment, the context may be represented as a tuple comprising various attributes describing the current operation of the client device. For example, context C may be represented as C=(L, U, C) where, L represents the location of the client device, U represents the user using the client device, and C represents the company for which the client device is being used. Other attributes that may be included in the context include the client device type, the time at which the client device is being used, the type of network used by the client device, the application which the user tries to access, and so on.

In an embodiment, a model comprises a set of attributes and values that are used by code executing on the client device. Changes in attributes and their values results in changes in the behavior of the code. For example, the client device may send different type of information in session records in different contexts. The context specific failure prediction model 310 comprises information describing expected behavior of various applications. For example, the context specific failure prediction model 310 may comprise expected values of various metrics describing performance of various applications.

The context specific failure prediction model 310 is used by the client device to prioritize the session records sent by the client device to the IT management system. For example, the context specific failure prediction model 310 describes the expected behavior of an application. In an embodiment, the failure prediction model 310 comprises a representation of minimum, maximum, average, and median response time of an application for a given context. The client device sends a session record to the IT management system if the session record corresponds to a behavior of the application that deviates more than a threshold from the expected behavior of the application.

As an example, the context specific failure prediction model 310 may specify the average response time of an application for a specific geo location. If the client device operating in that geo location identifies that an interaction with the application resulted in a response that took more than a threshold value more than the average response time of the application, the client device sends the session record for the interaction to the IT management system. However, if an interaction results in a response time with the application that is within the threshold value of the average response time, the client device does not send session records associated with the interaction. As a result, the number of session records sent by the client device to the IT management system can be reduced such that only session records significant for managing IT infrastructure are received by the IT management system.

Since the IT management system typically receives session records from a large number of client devices associated with several companies, the ability to reduce the number of session records allows efficient management of IT infrastructure without significant loss of useful information. Furthermore, the ability to reduce the number of session records sent to the IT management system reduces the load on the client device resources including the computing and network resources.

In another embodiment, the context specific failure prediction model 310 allows the data collection agent 340 to tag various session records with various flags. For example, the data collection agent 340 may tag a session record with specific warning. The data collection agent 340 may tag the session record with an indication of the severity of a warning. The data collection agent 340 may tag the session records based on different types of failures observed in the applications, for example, slow response of application, error returned by application, application not available, and so on. The determination of the flags by the data collection agent 340 off loads a portion of the processing of the session records from the IT management system to the client devices. As a result, a session record received from a client device may include pre-processed information rather than raw data. The IT management system may generate reports based on the flags for reporting. The IT management system may also use the flags for reporting warnings associated with applications or for further refining the context specific models.

The context specific performance model 320 comprises information describing expected performance of applications. In an embodiment, the context specific performance model 320 represents the frequency with which different type of data associated with objects is accessed and the access time to fetch the data in different contexts, for example, for different locations, for different companies, for different type of client devices, and so on. The data accessed by the client device from the applications may correspond to objects accessed by the client device, for example, HTTP (hyper text transfer protocol) objects.

In another embodiment, the context specific performance model 320 stores information describing the response times of applications for various types of requests corresponding to different contexts. The context specific performance model 320 may be represented as a mapping from contexts to response time of an application for a given type of request. A request may be characterized by the type of request as well as parameters of the request.

The performance optimizer 360 uses the context specific performance model 320 to predict information describing various requests. The performance optimizer 360 uses the predicted information for the requests to perform various types of optimizations that improve performance of the applications for the client device. The performance optimizer 360 may use the information from the context specific performance model 320 to modify requests sent to applications. For example, the performance optimizer 360 uses the context specific performance model 320 to predict the size of objects retrieved by various requests that the client device needs to process. The performance optimizer 360 re-orders the requests based on the predicted sizes of the objects so that the request to fetch larger objects are initiated before the requests to fetch smaller objects. Similarly, the performance optimizer 360 may re-order the requests to initiate requests with longer response time before requests with shorter request time.

In an embodiment, the performance optimizer 360 prefetches objects for which the frequency of access exceeds a predetermined threshold value. The performance optimizer 360 may combine requests that fetch frequently accessed objects into a single request. Combining various requests together is reduces the total outbound connections to the server and significantly improves performance in high latency networks. The performance optimizer 360 may determine frequency of objects using the context specific performance model 320 and cache frequently used objects in a cloud delivery network (CDN), for example, by providing appropriate instructions to the CDN. In an embodiment, the performance optimizer 360 uses the frequency of access of objects obtained from the context specific performance model 320 to select a specific caching algorithm used in the client device. Since the performance model 320 is context specific, the caching algorithm used for the same set of applications may be different for the client device when the context changes.

In an embodiment, the performance optimizer 360 uses the context specific performance model 320 to perform peer caching. The context specific performance model 320 may include information describing peer machines that have fetched certain data objects, for example, large data objects. The peer machines may correspond to machines that are on the same subnet. The performance optimizer 360 may retrieve these objects from the peer machine rather than from the server of the application.

The data collection agent 340 stores the session records corresponding to interactions of the client device with various applications. The data collection agent 340 sends the session records periodically as a batch. For certain types of session records, the data collection agent 340 sends the session record immediately without waiting for more session records to be accumulated. For example, if based on the failure prediction model 310, the data collection agent 340 determines that the session record represents failure of an application, the data collection agent 340 may send the session record right away.

Since the failure prediction model and the performance models are context specific, the client device may behave differently in one context compared to another context. For example, the performance optimizations performed in one location by the client device may be different from the performance optimizations performed by the client device in another context. Similarly, a session record in one context may generate a warning whereas a similar session record in a different context may not generate a warning. For example, a response time in a location with slow network may not generate a warning but the same response time in another location with faster network may result in warning that the application response it too slow.

Figure 4:
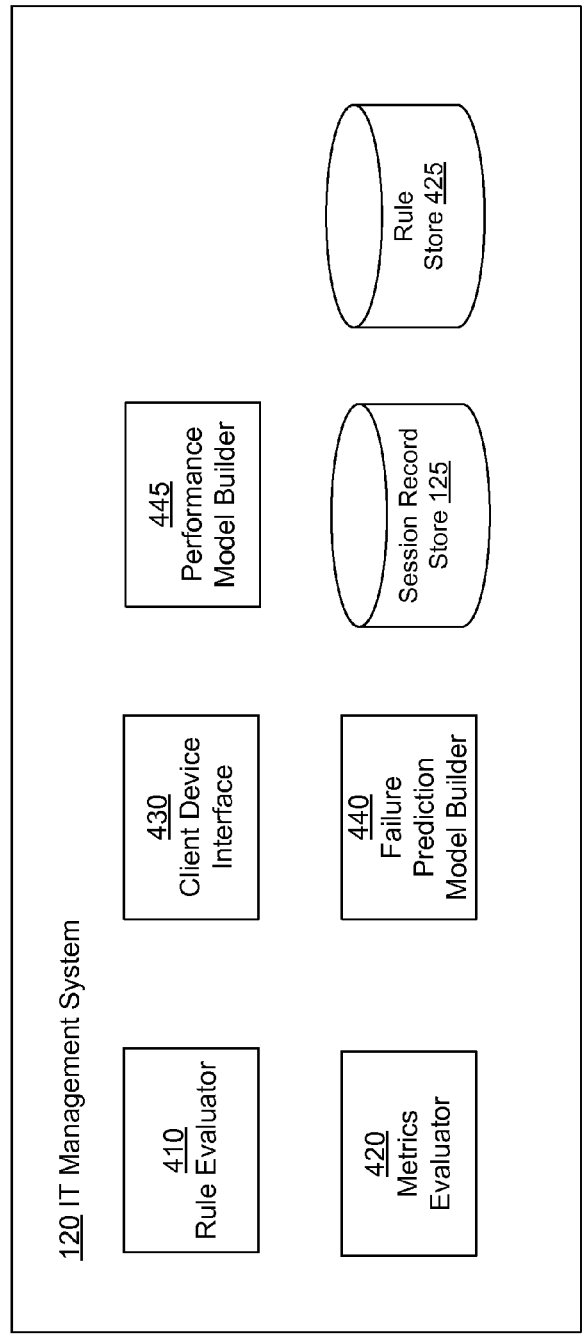
FIG. 4 shows the system architecture of the IT management system, in accordance with an embodiment.

FIG. 4 shows the system architecture of the IT management system, in accordance with an embodiment. The IT management system 120 includes a rule evaluator 410, a client device interface 430, a rule store 425, a report generator module 420, a failure prediction model builder 440, a performance model builder 445, and a session record store 125. An IT management system 120 may include additional or less modules than those shown in FIG. 4. Furthermore, specific functionality may be performed by different modules than those described herein.

The session record store 125 stores session records received by the IT management system 120 from various client devices. In an embodiment, the session records store 125 is implemented as a database, for example, a relational database. The session records 150 may be stored as database tables and can be joined with other information. For example, a table may store information describing various users and the user ID 220 of the session record may be joined with the user table to determine additional information describing the user associated with the session record. The user table may be used to associate the session record with attributes of the user, for example, a role of the user in the enterprise, thereby allowing aggregation of session records based on attributes of the users.

Another table may store information describing the client devices. The session records of the session record table may be joined with the table storing the client device information using the device ID 225. This allows the IT management system 120 to determine client device information for a session record, for example, the type of client device, the vendor that provided the client device, and so on.

In an embodiment, the IT management system stores information as a star schema. The session records correspond to a fact table. There may be several dimension tables, for example, a dimension table storing client device information, a dimension table storing user information, a dimension table storing application information, and so on. The report generator 420 joins the fact table storing session records with one or more dimension table to generate reports.

The metrics evaluator 420 determines values of various metrics based on session records. A metric may represent aggregate response time for a set of applications. In an embodiment, the metric evaluator 420 generates an execution plan corresponding to a metric based on operators representing individual steps of computation. Examples of operators include grouping, aggregating, sorting, merging, and filtering session records.

An aggregate value may correspond to minimum, maximum, median, or mean response time of one or more application for requests filtered based on various criteria. For example, a metric may represent aggregate response time for all applications of an enterprise, aggregate response time of all applications based on requests from client devices from a location, aggregate response time of all applications based on requests from client devices of a department of the enterprise, or aggregate response time of all applications based on requests from a set of people having a particular characteristic such as all executives of an enterprise or all engineers of the enterprise and so on.

Other types of metrics evaluated by the metrics evaluator 420 include metrics representing aggregate response time for specific types of requests or aggregate response time for specific values of parameters sent with the requests. For example, if an application allows users to communicate using email one type of request corresponds to reading emails, another type of request corresponds to sending emails, and so on.

The metrics evaluator 420 evaluates various metrics based on rates of changes of response time of applications. For example, a metric may represent the rate at which response time of an application is changing over time for the enterprise. Other metrics may represent rate of change of response time for one or more applications for client devices from a department, a set of users, various locations, and so on. The rate of change of response time allows the IT management systems to determine whether the response time of an application is degrading at such a rate that an alert should be sent informing a system administrator to take action before the performance degrades more than a threshold level. For example, the IT management system compares the rate of change of a specific metric with a threshold value to determine if an alert should be sent. In an embodiment, the IT management system ensures that the rate of change is high consistently for more than a threshold time period, to make sure that the increase in rate was not temporary, for example, associated with a spike in usage.

In some embodiments metrics evaluator 420 evaluates the metrics on an ongoing basis as new session records are received. The metrics may be evaluated for each new session record received that affects the metric or the metrics may be evaluated if more than a threshold number of session records corresponding to the metric are received. For example, a metric that represents average response time of an application for a location may be updated whenever a session record corresponding to that application for the location is received or when more than a threshold number of session records corresponding to that application for the location are received. The metric is reevaluated by determining the incremental effect of the new session record(s) and combining it with the existing metric value. This allows efficiently updating the metric values as more and more session records are received.

The metrics evaluator 420 may combine information stored in session records with other types of information, for example, information describing client devices, information describing users, information describing attributes and so on. The process of determining the metrics ensures that determining a metric is efficient. This allows the overall process of generating advanced warning based on metrics to be completed in a short time allowing real-time or near real-time generation of advanced warnings.

The rule store 425 stores various rules associated with enterprises that identify situations that require an IT person or system administrator to be alerted. A rule uses values of metrics determined by the metrics evaluator 420 to arrive at conclusions that describe the health of one or more IT resources, for example, applications, servers, networks, and so on. A rule may classify the health of an IT resource according to different levels of urgency, for example, certain situations may require immediate attention whereas other situations may be classified as less urgent.

A rule may be represented using a markup language, for example, XML (extensible markup language.) A rule may also be specified using the syntax of a custom language, for example, a language that is processed by the IT management system. Following are examples of rules that may be stored in rule store 425 using a custom language.

A rule may specify that if more than a threshold number of users from one or more companies report a failure of an application, the IT management system may predict failure of the application for all companies. Alternatively, a rule may specify that if more than a threshold number of users from one or more companies report failures associated with a particular location, the IT management system may predict failure of the application for all companies for the given location. Alternatively, a rule may specify that if more than a threshold number of users from one or more companies report failures for a particular device, the IT management system may predict failure of the application for all companies for the given device. An example of a rule is "If N users from M companies see failures with application A in location G on device D, predict failure for app A in location G on device D for all companies." Accordingly, if more than a threshold number of failures are reported for a given context, the failure may be predicted for other companies as well even though they haven't yet reported failures. A context may be defined based on companies, types of devices, locations, users, and so on.

A rule may specify failures for a specific company based on failures reported by sets of users or users from specific locations of the company. For example, a rule may specify "If N users for company C see failures with application A in location G on device D, predict failure for app A for company C in location G on device D." Accordingly, if more than a threshold number of users of the company report failures for an application for a particular location and a particular device, the IT management system reports failure of the application for that particular company for that location, for that device.

A rule may specify that if the response time is more than a threshold value for more than a threshold number of users, a failure may be predicted for the application. As an example, a rule may specify "If N users for company C see more than X response times with application A in location G on device D, predict failure for app A for company C in location G on device D." Accordingly, if more than a threshold number of users of the company have experienced a response time that exceeds a threshold value X, the IT management system may report a failure of the application, even though no failures have actually been reported by users.

The rule evaluator 410 evaluates the rules stored in the rule store 525 using the data from report store 445 to take various actions. The actions corresponding to various rules may comprise, reporting information on a user interface, sending an alert to specific users, for example, by texting, emailing, paging, and so on. In an embodiment, the action may correspond to sending a system command, for example, shutting down an application that is determined to have degraded to a significant level.

The client device interface 430 interacts with the client devices. For example, the client devices interface 430 receives session records from various client devices. The client device interface 430 may specify the type of information that is received from specific client devices. For example, if a particular type of failure is expected in a location, the client device interface 430 may request client devices from the location to report additional information in the form of session records that are not reported by client devices from other locations. The client devices interface also sends specific information to client devices, for example, a context specific user access model generated by the IT management system.

The failure prediction model builder 440 builds failure prediction models for different contexts in which client devices may interact with applications. The performance model builder 445 builds performance models for different contexts in which client devices may interact with applications. The client device interface 430 communicates the information describing a context specific model to the client device.

Overall Process

Figure 5:
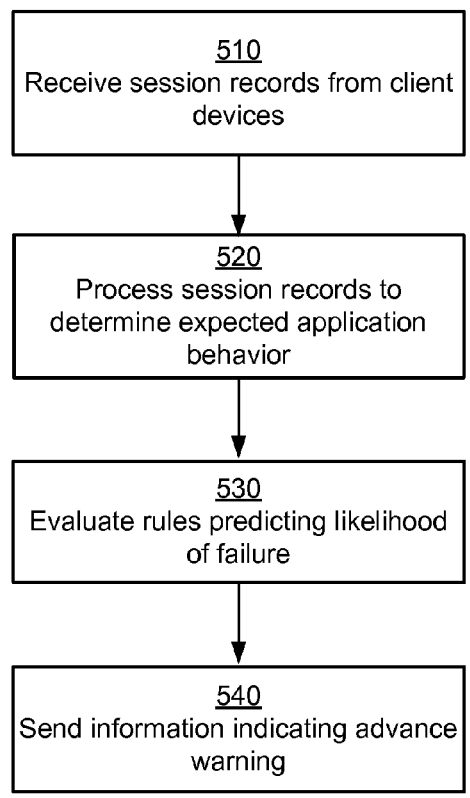
FIG. 5 shows a flowchart lustrating the process for predicting failures, in accordance with an embodiment of the invention.

FIG. 5 shows a flowchart lustrating the process for predicting failures, in accordance with an embodiment of the invention. The steps described herein can be performed in an order different from those described herein. Furthermore, the steps may be performed by a different module than those described herein.

The client device interface 430 receives 510 session records 150 from various client devices 105. The session records include information illustrated in FIG. 2 including the response time of applications 130 and various attributes describing the client device 105, the request sent to the application 130 and so on. The client device interface 430 stores the session records in the session records store 125.

The metrics evaluator 420 determines the values of various metrics based on the information stored in the session records. The metrics may be determined by combining information stored in session records with other information, for example, client device information, user information, location information and so on. In an embodiment, the metrics represent aggregate information along various dimensions. For example, a metric may represent aggregate response time for an application over a geographical location over a time period, a department of the enterprise, over the entire enterprise.

The rule evaluator 410 evaluates 530 various rules stored in the rule store 425. The rule evaluator 410 may evaluate the rules periodically, for example, each time the reports are generated. The steps 520 and 530 of the process shown in FIG. 5 may be repeated periodically, for example, based on a predetermined schedule. In an embodiment, different reports may be regenerated at different rates, for example, certain reports determined to take longer to generate may be generated at a lower frequency than simpler reports. The rules may be associated with specific reports and may be evaluated whenever an underlying report is regenerated.

The rule evaluator 410 triggers various actions based on the rules that are evaluated. For example, the rule evaluator 410 may send 540 information indicating an advanced warning that a particular application is likely to fail for a company or for a particular location. The result of evaluation of various rules may be observed on a user interface by a system administrator to evaluate the overall health of IT infrastructure of the enterprise.

Figure 6A:
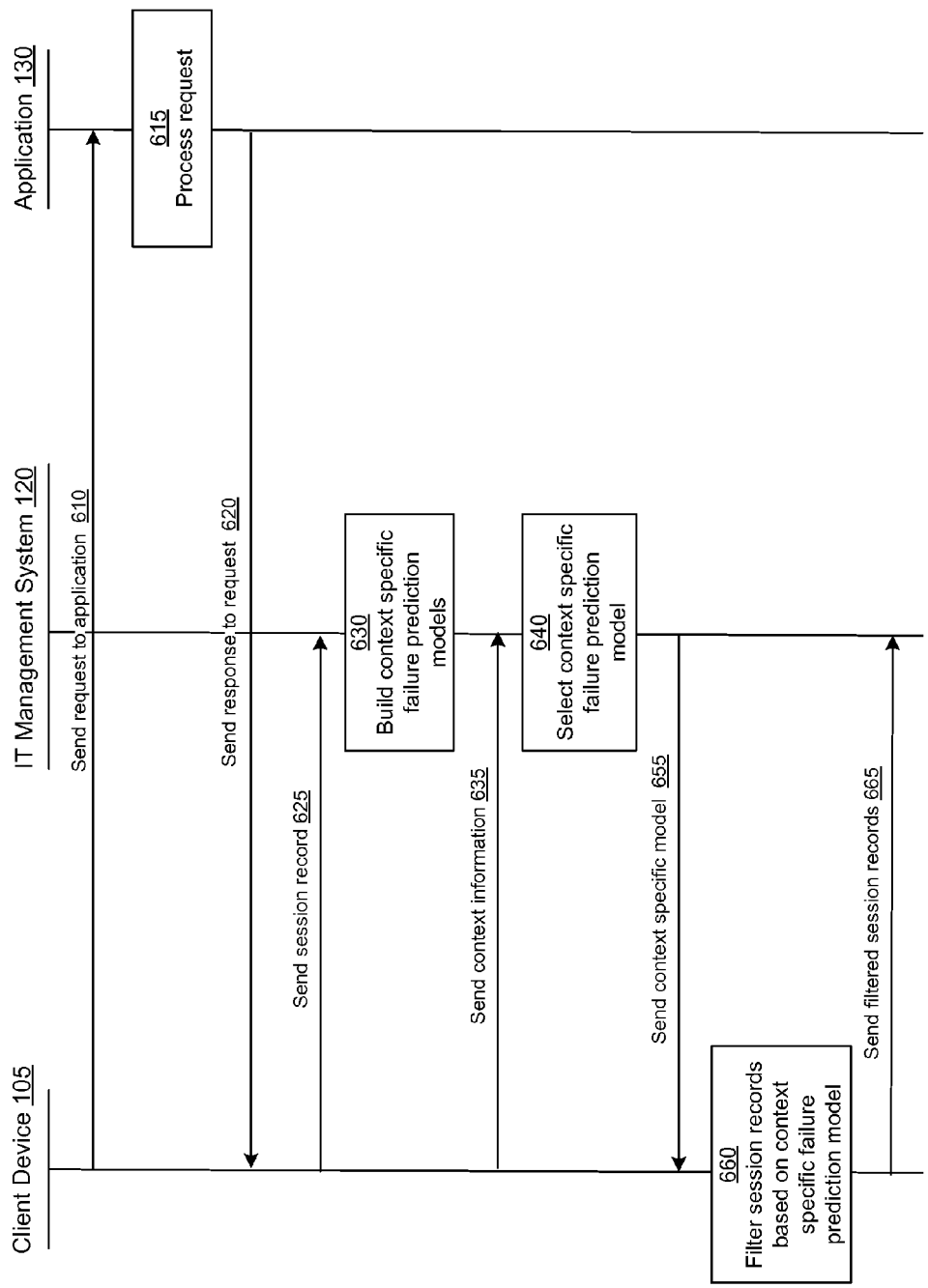
FIG. 6A shows an interaction diagram illustrating the interactions between a client device, an application and the IT management system to build context specific failure prediction models, in accordance with an embodiment of the invention.

FIG. 6A shows an interaction diagram illustrating the interactions between a client device, an application and the IT management system to build context specific failure prediction models, in accordance with an embodiment of the invention. The client device 105 sends 610 requests to the application 130. There may be several different types of requests that are supported by each application. Each request may include one or more parameters. Typically there are several client devices that send requests to an application. The application 130 processes 620 the request and sends 630 the response to the client device 105.

The client device 105 may store a session record based on the information describing the request and response. The client device 105 sends 640 the session record to the IT management system 120. The IT management system receives session records from several client devices. The IT management system analyzes the various session records to build 630 context specific failure prediction models.

The client device 105 sends 675 context information of the client device. The context evaluator 350 of the client device determines whether the context of the device has changed and sends 675 the new context to the IT management system. The IT management system may maintain a mapping from various client devices to the context information of the client devices received last. The IT management system selects a context specific failure prediction model for the client device based on the received context. The IT management system sends 655 the context specific failure prediction model to the client device.

The client device 105 uses the context specific failure prediction model to determine which session records are sent to the IT management system. Accordingly, the data collection agent 340 of the client device 105 filters 660 the session records based on the context specific failure prediction model and sends 665 the filtered session records to the IT management system. The IT management system uses the received session records to further refine the context specific models. The above process is repeated, i.e., the IT management system continues to receive session records from various client devices to refine the context specific models and the client devices keep receiving new context specific failure prediction model when their context changes.

Figure 6B:
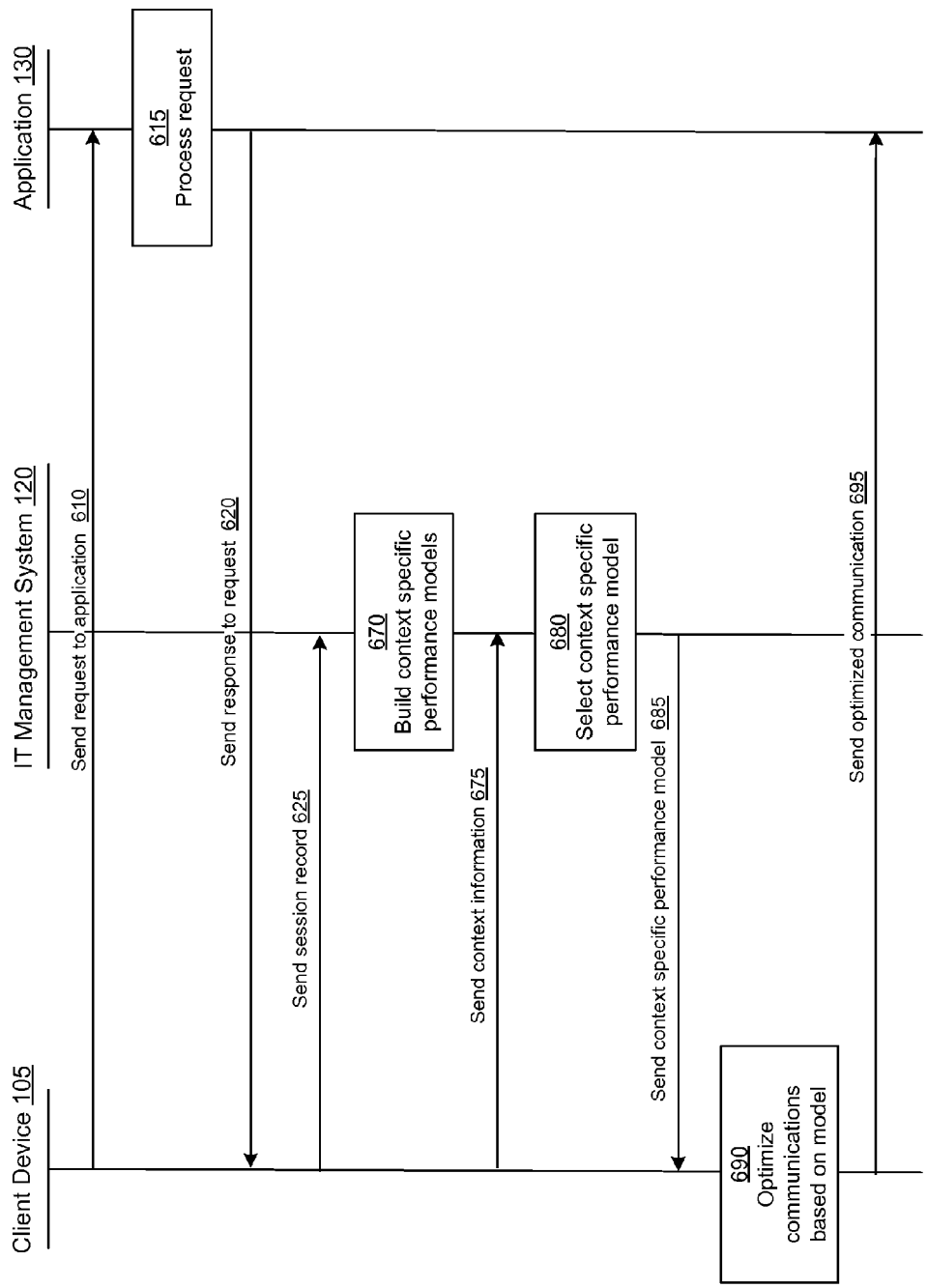
FIG. 6B shows an interaction diagram illustrating the interactions between a client device, an application and the IT management system to build context specific performance models, in accordance with an embodiment of the invention.

FIG. 6B shows an interaction diagram illustrating the interactions between a client device, an application and the IT management system to build context specific performance models, in accordance with an embodiment of the invention. The steps 610, 615, 620, and 625 are as described above for FIG. 6A. The IT management system 120 receives session records from various client devices for various applications and builds 670 context specific performance models for the application. A context specific performance model allows prediction of performance related information for requests sent to an application including the response time, size of data accessed by the request, types of objects accessed by the request and so on.

The client device sends 675 context of the client device information to the IT management system 120. The context evaluator 350 of the client device determines whether the context of the device has changed and sends 675 the new context to the IT management system. The IT management system selects 680 a context specific performance model for the context of the client device and sends 685 the context specific performance model to the client device. The performance optimizer 360 of the client device performs various optimizations based on the context specific performance model, for example, the performance optimizer 360 optimizes 690 communications sent from the client device to the application based on the model. The performance optimizer 360 sends 695 the optimized communications to the application. Other examples of optimizations performed by the performance optimizer are described herein.

FIG. 7 shows a screenshot of a user interface showing session records collected by the IT management system, in accordance with an embodiment of the invention. The IT management system can receive session records from multiple users of multiple enterprises. The user interface 700 allows a user to filter the session records presented based on various criteria. The various filters shown in FIG. 7 include a filer 710*a* by application that allows session records to be filtered by a specific application, a filter 710*b* by location that allows session records to be filtered by a location, a filer 710*c* by networks that allows session records to be filtered by a particular network, a filter 710*d* by devices that allows session records to be filtered by a type of client device, a filter 710*e* by user name that allows session records to be filtered by a specific user ID, and a filter by time that allows session records to be filtered by a given time range.

Filters other than those shown in FIG. 7 may be allowed, for example, filter by company name, filter by specific attributes of users, filter by type of requests sent to the application, filter by parameters of requests sent to applications, and so on. A user may select a combination of filters, for example, to view all session records from a location for a particular application or to view all session records for an application for a particular device type. Although, the user interface 700 allows users to filter session records for purposes of viewing, the IT management system may use various filters for internal use, for example, to evaluate rules stored in rule store 425.

Figure 8:
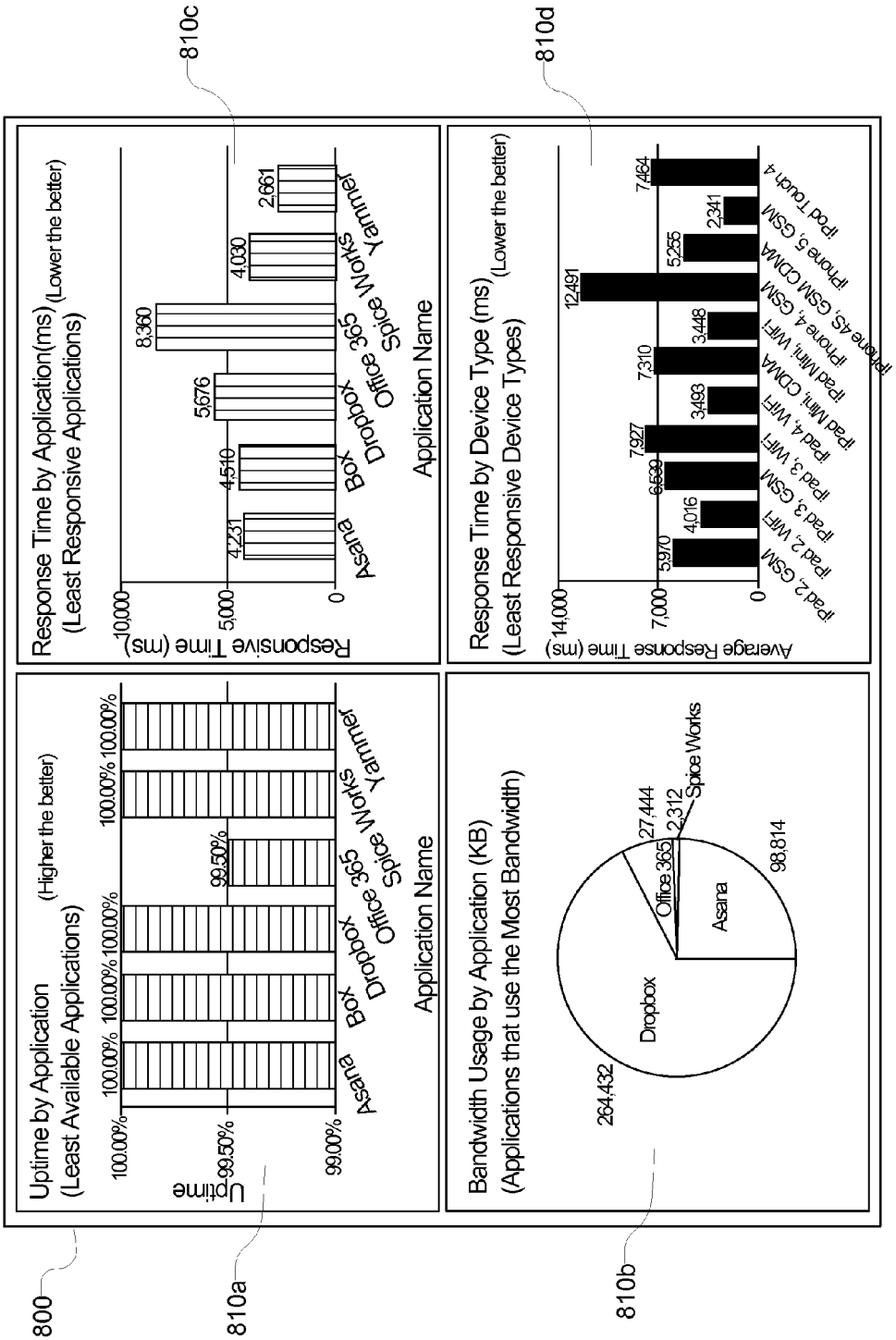
FIG. 8 shows a screenshot of a user interface showing various reports generated by the IT management system, in accordance with an embodiment of the invention.

FIG. 8 shows a screenshot of a user interface showing various reports generated by the IT management system, in accordance with an embodiment of the invention. The report 810*a* shows uptime of various applications. The uptime refers to the amount of time that the application functioned properly. The uptime of an application shown by report 810*a* may be for a particular time interval for example, the last week. As shown in FIG. 8, report 810*b* shows bandwidth usage of different applications. This report allows a user to determine the applications that use significant amount of bandwidth. This report also allows the IT management system to determine if an application is using more bandwidth than expected, for example, based on past usage.

Report 810*c* shows response time of different applications. A user or the IT management system may use this report to determine if the response time of an application is slower than expected, for example, based on past usage. The IT management system may send an alert informing a system administrator to take a corrective action. For example, the response time of the application may be corrected by using a more powerful server for the application or by identifying any issue with the performance. Report 810*d* shows response time of applications by different device types. Reports other than those shown in FIG. 8 may be generated, for example, reports of response time of applications by request types, reports of response time of applications by parameter values, rate of change of response time of applications, and so on. Although, the user interface 700 allows users to view reports for purposes of viewing, the IT management system may use various reports for internal use, for example, to evaluate rules stored in rule store 425.

Figure 9:
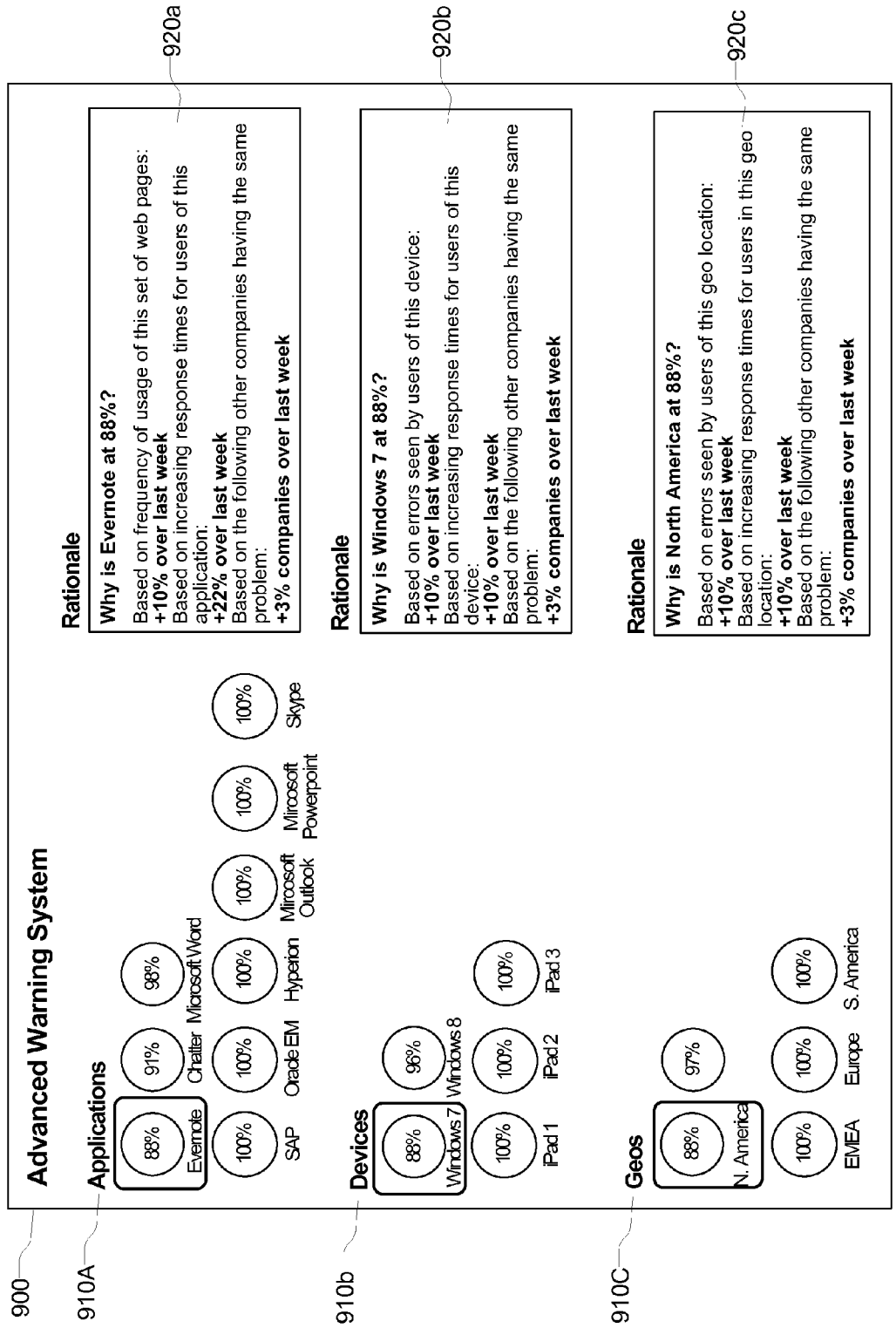
FIG. 9 shows a screenshot of a user interface showing advanced warnings generated by the IT management system, in accordance with an embodiment of the invention.

FIG. 9 shows a screenshot of a user interface showing advanced warnings generated by the IT management system, in accordance with an embodiment of the invention. The user interface 900 shows advanced warnings 910 generated based on rules evaluated by the rule evaluator 410. The user interface 900 also shows rationale behind the advanced warning by analyzing the rules that triggered the warning. In an embodiment, a rule is associated with specific rationale that can be presented when the rule is triggered.

Advanced warning 910a shows warnings based on performance of applications. The performance of an application may be measured based on uptime of the application or the response time. For example, if the response of the application is too slow or the application is down for certain amount of time, the performance of the application may be determined to be low. For example, if a measure of performance of an application is below a threshold value, an advanced warning may be generated. As shown in FIG. 9, the advanced warning 910a indicates that application "Evernote" was identified as having a uptime of 88% over a given time interval.

The user interface 900 presents the rationale 920a describing why an application generated the warning 910a. As shown by the rationale 920a, the warning 910a may have been generated because the frequency of usage of the application was higher during the time interval and the response time of the application had increased in the time interval. Furthermore, the rationale 920a also specifies a number of other companies that had similar problem. The IT management system may determine that a problem is associated with the application if more than a threshold number of companies have a problem due to the application. However, if only a small number of companies have a problem compared to several other companies that have not seen any problem, the IT management system may determine that the problem is caused by the IT infrastructure of the individual companies rather than the application itself.

Advanced warning 910b shows that a particular type of client device is having a problem based on number of issues associated with the device observed during a time interval. The devices may be identified by the type of hardware of the device or by the type of operating system executing on the device. The rationale 920b describes that the advanced warning for the type of device was generated because of an increase in errors seen by users of the device over a time interval, for example, over the last week. The rationale 920b also describes that the response time aggregated over the device of this type for various applications increased during the time interval. Furthermore, the rationale 920b also provides information about other companies that had similar problems.

Advanced warning 910c identifies issues with a location. The location may be associated with a specific enterprise or may be a location for all enterprises. According to the warning 910c, the location or region of "North America" was identified as having certain issues. The issues may be associated with specific applications or may be observed over all applications. The rationale 920c describes that the warning 910c was generated because the IT management system observed an increase in errors by client devices from this region and also there was an overall increase in the response time of applications from this region. Furthermore, the rationale 920c provides information about other companies that had similar problems.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for managing operation of an application hosted by a data center for a plurality of client devices networked to a data center through a data plane including a first network infrastructure, wherein the plurality of client devices is associated with an enterprise, the method comprising:
  establishing a control plane that includes a second network infrastructure to allow direct communication to an information technology (IT) management system independent of communication through the data plane between the plurality of client devices and the data center;
  receiving session records from the operation of the application to the IT management system via the control plane, wherein the session records each include a value of a response time of an application for an interaction with a client device;
  storing the received session records via the IT management system in a storage device;
  determining a threshold response time value based on an aggregate value of response times of the application from the received session records;
  receiving a new session record describing interactions of a client device with the application;
  communicating a warning of a failure of the application to the enterprise if the response time of the new session record exceeds the threshold response time value;
  collecting session records from other devices associated with other enterprises;
  determining whether more than a threshold number of enterprises have an issue associated with the failure;
  responsive to determining that more than a threshold number of enterprises have the issue, determining that the issue is with the application rather than a specific enterprise; and
  responsive to determining that less than the threshold number of enterprises have the issue determining that a scope of the issue is the one or more enterprises.

2. The method of claim 1, wherein the data center is managed by the enterprise.

3. The method of claim 1, wherein the data center is managed by a Software as a Service (SaaS) hosting system.

4. The method of claim 1, wherein the session records are collected by an agent executed by the client device.

5. The method of claim 1, further comprising sending filtering data based on a model, wherein the received session records are filtered according to the sent filtering data.

6. The method of claim 1, wherein the interaction includes the fetching of types of HTTP objects accessed by the client device.

7. The method of claim 1, wherein the session records include data on interactions performed by the client devices with the application, response time for the interaction, a location of the client device, a type of the client device, and the enterprise associated with the client device, and wherein the threshold response time value is based on the location of the client device, the type of the client device, and the enterprise associated with the client device.

8. The method of claim 7, further comprising determining an issue resulting in the failure of the application based on the received session records, wherein the issue is one of the first network, the type of client device, the location of the client device, the application, a server of the data center.

9. A computer readable non-transitory storage medium storing instructions thereon, the instructions when executed by a processor of an information technology (IT) management system for managing operation of an application hosted by a data center for a plurality of client devices networked to data center through a data plane including a first network infrastructure, wherein the plurality of client devices is associated with an enterprise, cause the processor to:
  establish a control plane that includes a second network infrastructure to allow direct communication to the IT management system independent of communication through the data plane between the plurality of client devices and the data center;
  receive session records from the operation of the applications to the IT management system via the control plane, wherein the session records each include a value of a response time of an application for an interaction with a client device;
  determine a threshold response time value based on an aggregate value of response times of the application from the received session records;
  receive a new session record describing interactions of a client device with the application;
  communicate a warning of a failure of the application to the enterprise if the response time of the new session record exceed the context specific threshold response time value;
  collect session records from other devices associated with other enterprises;
  determining whether more than a threshold number of enterprises have an issue associated with the failure;
  responsive to determining that more than a threshold number of enterprises have the issue, determine that the issue is with the application rather than a specific enterprise; and
  responsive to determining that less than the threshold number of enterprises have the issue determine that a scope of the issue is the one or more enterprises.

10. The computer readable non-transitory storage medium of claim 9, wherein the data center is managed by the enterprise.

11. The computer readable non-transitory storage medium of claim 9, wherein the data center is managed by a Software as a Service (SaaS) hosting system.

12. The computer readable non-transitory storage medium of claim 9, wherein the session records are collected by an agent executed by the client device.

13. The computer readable non-transitory storage medium of claim 9, the instructions cause the processor to send filtering data based on a model, wherein the received session records are filtered according to the sent filtering data.

14. The computer readable non-transitory storage medium of claim 9, wherein the interaction includes the fetching of types of HTTP objects accessed by the client device.

15. The computer readable non-transitory storage medium of claim 9, wherein the session records include data on interactions performed by the client devices with the application, response time for the interaction, a location of the client device, a type of the client device, and the enterprise associated with the client device, and wherein the threshold response time value is based on the location of the client device, the type of the client device, and the enterprise associated with the client device.

16. The computer readable non-transitory storage medium of claim 15, wherein the instructions cause the processor to determine an issue resulting in the failure of the application based on the received session records, wherein the issue is one of the first network, the type of client device, the location of the client device, the application, a server of the data center.

17. An information technology management system managing operation of an application hosted by a data center for a plurality of client devices networked to the data center through a data plane including a first network infrastructure, wherein the plurality of client devices is associated with an enterprise, the system comprising:
 a control plane that includes a second network infrastructure to allow direct communication to the client devices independent of communication through the data plane between the plurality of client devices and the data center;
 a client device interface to receive session records from the operation of the application to the IT management system via the control plane, wherein the session records wherein the session records each include a value of a response time of an application for an interaction with a client device;
 a storage device storing the received session records;
 a metrics evaluator to determine a threshold response time value based on an aggregate value of response times of the application from the received session records; receive a new session record describing interactions of a client device with the application; communicate a warning of a failure of the application to the enterprise if the response time of the new session record exceeds the specific threshold response time value; collect session records from other devices associated with other enterprises; determine whether more than a threshold number of enterprises have an issue associated with the failure; responsive to determining that more than a threshold number of enterprises have the issue, determine that the issue is with the application rather than a specific enterprise; and responsive to determining that less than the threshold number of enterprises have the issue determine that a scope of the issue is the one or more enterprises.

\* \* \* \* \*